United States Patent Office 3,536,644
Patented Oct. 27, 1970

3,536,644
MEANS FOR PROVIDING BIAXIALLY ORIENTED POLYPROPYLENE FILMS WITH IMPROVED PHYSICAL PROPERTIES
William G. Frizelle, Flushing, Mich., William F. Beveridge, Trumbull, Conn., and Joseph R. Kincaid, Palmyra, N.Y., assignors to National Distillers and Chemical Corporation, New York, N.Y., a corporation of Virginia
No Drawing. Filed June 22, 1967, Ser. No. 647,938
Int. Cl. C08f 45/52, 29/12
U.S. Cl. 260—28.5           4 Claims

ABSTRACT OF THE DISCLOSURE

Biaxially oriented polypropylene films incorporating polyethylene waxes, having average molecular weights of from 1500 to 3000, in amounts of from 2% to 10% by weight of the film compositions. The low molecular weight polyethylene wax imparts heat-sealing and improved optical and mechanical characteristics to the polypropylene film. Heat-sealability is further improved by the incorporation of slip additives in the film composition.

---

This invention relates to a method for the manufacture of biaxially oriented polypropylene films, and to such films exhibiting improved heat-sealability and other mechanical and optical characteristics.

In the following specification, all parts and percentages are given by weight, unless otherwise indicated.

The manufacture of biaxially oriented polypropylene films for packaging and like purposes is, of course, well known. Unfortunately, oriented polypropylene films possess relatively poor heat sealing characteristics. Accordingly, in order to facilitate the use of such films in the flexible film packaging field, it has been necessary to develop various techniques for improving the heat-sealability thereof. The several procedures previously suggested for such purpose include the application of suitable surface layers to the oriented polypropylene film, employing various coating or laminating techniques. Such operations are disclosed, for example, in copending application Ser. No. 556,870 entitled "Heat-Sealable Oriented Polypropylene Film Laminates," filed on June 13, 1966, and owned by the assignee of the present invention, and in the various applications and patents incorporated by reference therein.

It is a primary object of the present invention to provide a method for the manufacture of biaxially oriented polypropylene films, and such films, which needed neither be coated with nor laminated to heat-sealable surface layers, and yet which nevertheless exhibit satisfactory heat-sealing characteristics for packaging and like applications.

It is among the further objects of the invention to provide biaxially oriented polypropylene films which exhibit improved optical properties, superior tensile impact strength stability, and improved receptivity to electronic, flame or chemical surface treatment, as compared with oriented polypropylene films not treated in accordance therewith.

The nature and objects of the invention will be more apparent from the following detailed description of preferred forms thereof.

We have found that improved biaxially oriented polypropylene films may be produced by admixing the resinous polypropylene material, prior to extrusion, with a low molecular weight polyethylene wax, the latter being incorporated in the film composition in an amount of from about 2% to 10% by weight thereof. Polypropylene films which have been thus extruded and biaxially oriented in known manner to achieve finished thicknesses of about 0.3 to 10.0 mils exhibit markedly improved heat-sealability, as contrasted with biaxially oriented polypropylene films which do not contain such a low molecular weight polyethylene wax.

As noted hereinabove, the low molecular weight polyethylene wax is incorporated in the polypropylene film composition hereof in an amount of from about 2% to 10% of the composition. Waxes so useful have average molecular weights of from about 1500 to 3000, the "Epolene" and "A-C" waxes commercially available from the Eastman Kodak Co. and the Allied Chemical Corporation, respectively, being so useful. Optimum results have been obtained by incorporating a polyethylene wax having an average molecular weight of about 2000 (e.g., that available as "A-C 6", from the Allied Chemical Corporation) in the polypropylene film-forming composition, in an amount of about 5% by weight thereof. While, as noted hereinabove, greater concentrations of the wax may be admixed with the polypropylene material, it has been found that the use of such greater quantities does not materially further improve the heat-sealing, optical and/ or other mechanical characteristics of the oriented film product.

The polypropylene film composition preferably contains, in addition to the indicated low molecular weight polyethylene wax, a slip additive in an amount of from about 100 to 2000 p.p.m., desirably about 800 p.p.m., by weight thereof. Any of the slip additives (also known as anti-blocking materials) commercially employed to prevent blocking or cohesion of adjacent polypropylene films may be used for this purpose. Such additives include, for example, stearamide, oleamide, and erucamides.

It is believed that the slip additives, when incorporated in the polypropylene film composition, tend to increase the concentration of the low molecular weight polyethylene wax adjacent the surface of the oriented polypropylene film. It will, however, be understood that the present invention is not restricted to any particular chemical mechanism, it appearing that whatever mechanism may take place, those oriented polypropylene films incorporating slip additives, in addition to the low molecular weight wax hereof, exhibit still further improved heat-sealing characteristics.

The polypropylene films hereof may be extruded in conventional manner and thereafter oriented in both the machine (longitudinal) and transverse directions to produce the desired biaxial orientation. The orientation itself may be achieved employing any of the known procedures utilized in the art for such purpose. For example, the biaxial orientation may be effected by sequentially and separately stretching the extruded film, initially in the machine direction and thereafter in the transverse direction and, if a balanced film is desired, subsequently again in the machine direction. Such operations are described, for example, in copending application Ser. No. 253,286 entitled "Improved Thermoplastic Films," filed on Jan. 23, 1963, and owned by the assignee of the present invention.

Alternatively, the biaxial orientation of the polypropylene film may be effected by the simultaneous stretching of the film in both the machine and transverse directions as described, for example, in U.S. Pat. No. 3,048,895.

As a still further alternative, the biaxial orientation of the polypropylene film hereof may be effected by sequentially stretching the film in first the machine direction and then the transverse direction, and then repeating such procedure one or more additional times, each of the individual stretching operations being itself insufficient to obtain complete orientation. A process for so achieving biaxial film orientation is described more fully in copending application Ser. No. 554,577 entitled "Multiple Sequence Process for the Manufacture of Oriented Thermoplastic and Thermosetting Film," filed on June 1, 1966, and owned by the assignee of the present invention.

The machine or longitudinal stretching of the polypropylene film may be accomplished in any conventional manner, as by passing the film over a series of rolls operating at differential speeds. Similarly, any conventional apparatus utilized to effect transverse or lateral stretching of continuous web or film material may be employed to impart the desired transverse orientation to the polypropylene film. It is preferred, however, to utilize a textile type tenter frame to perform the desired transverse stretching operations. Such apparatus and the conditions in accordance with which it may be utilized in the orientation of polypropylene or other thermoplastic films is more fully described in the aforesaid copending application Ser. No. 253, 286.

The following examples are but illustrative of the manufacture and characteristics of preferred embodiments of the biaxially oriented polypropylene film of the present invention.

Polypropylene resins either alone or admixed with a polyethylene wax and/or slip additive were extruded to form the various test films, the compositions of which are identified in Table I below. Each test film was extruded under standard operating conditions and the physical properties of the resulting films determined and recorded in Table II. The optical and mechanical characteristics of each test film were determined (1) immediately after extrusion, (2) after four days aging, and (3) after a total of seven days aging.

The heat-sealing characteristics of various of the test films were determined by slitting the test films into 15-inch widths and sealing the same on a bread over-wrap machine. The heat-seal strengths of various oriented polypropylene films prepared in accordance with the present invention are compared with the like characteristic of corresponding control films in Table III below.

The heat-sealability of film embodiments of the invention, both with and without a slip additive (Examples 3 and 4), were thus compared with control films similarly constituted (Controls C and D). Similarly, the heat-sealing characteristics of an oriented film hereof incorporating a Japan wax type coating to further improve heat-sealability (Example 5) was compared with a special film having plural coatings designed specifically to improve the heat-sealing characteristics thereof (Control E). The comparative seal strengths are given in Table III below.

TABLE I.—POLYPROPYLENE TEST FILM COMPOSITIONS

|  | Polyethylene wax [1] | Slip additive,[2] p.p.m. | Topcoat [3] |
|---|---|---|---|
| Example: |  |  |  |
| 1 | 5% AC-6 |  |  |
| 2 | 5% AC-6 |  |  |
| 3 | 5% AC-6 |  |  |
| 4 | 5% AC-6 | 1,800 |  |
| 5 | 5% AC-6 |  | Topcoat without pre-coat. |
| Control: |  |  |  |
| A |  |  |  |
| B |  |  |  |
| C |  | 1,200 |  |
| D |  |  |  |
| E |  |  | Topcoat plus pre-coat. |

[1] AC-6 is a polyethylene wax having an average molecular weight of 2,000, a melting point of 219-226° F., a hardness (ASTM D 1321-55T) of 3-5, a specific gravity of 0.92, and an average viscosity (at 140° C.) of 180 cps.
[2] The slip additive employed in these experiments was erucamide.
[3] The topcoat employed in these experiments contained Japan wax in a polyvinyl acetate binder; in Control E a pre-coat of polyethylene imine in a water-alcohol mixture was applied to the polypropylene film prior to the Japan wax topcoating.

TABLE II.—OPTICAL AND MECHANICAL PROPERTIES OF TEST FILMS

|  | Example 1 | | | Example 2 | | | Example 3 | | | Control A | | | Control B | | |
|---|---|---|---|---|---|---|---|---|---|---|---|---|---|---|---|
|  | Fresh | 4 days | 7 days | Fresh | 4 days | 7 days | Fresh | 4 days | 7 days | Fresh | 4 days | 7 days | Fresh | 4 days | 7 days |
| Average gauge (mils) | .544 |  |  |  |  |  | .587 |  |  | .587 |  |  | .573 |  |  |
| Haze | .9 | 1.1 |  |  | .9 |  | .4 | .8 |  | 1.1 | 2.6 |  | 1.0 | 2.5 |  |
| Gloss | 84.6 | 87.0 |  |  | 89.0 |  | 86.2 | 88.3 |  | 87.2 | 81.1 |  | 80.0 | 78.3 |  |
| Tensile impact, M.D. (ft.lb./in.³): |  |  |  |  |  |  |  |  |  |  |  |  |  |  |  |
| High | 1,820 |  |  |  |  |  | 1,650 |  |  | 2,070 |  |  | 1,850 |  |  |
| Low | 1,610 |  |  |  |  |  | 1,550 |  |  | 1,650 |  |  | 1,730 |  |  |
| Average | 1,685 | 1,145 | 2,030 |  | 2,000 | 1,980 | 1,610 | 1,595 | 2,050 | 1,820 | 2,080 | 2,160 | 1,780 | 1,710 | 1,630 |
| Yield, M.D. (p.s.i.) | 4,790 |  | 4,680 |  |  | 4,130 | 4,754 |  | 4,790 |  |  | 5,100 |  |  | 5,200 |
| Ultimate, M.D. (p.s.i.) | 9,004 |  | 7,290 |  |  | 8,400 | 9,155 |  | 8,500 |  |  | 9,200 |  |  | 9,100 |
| Modulus, M.D. (p.s.i.×10⁻²) | 1,686 |  | 1,805 |  |  | 2,010 | 1,831 |  | 2,060 |  |  | 2,328 |  |  | 2,226 |
| Percent dimensional stability, M.D. | 2.5 |  |  |  |  |  | 1.5 |  |  | 2.0 |  |  |  |  |  |
| Percent dimensional stability, T.D. | 2.8 |  |  |  |  |  | .3 |  |  | 1.8 |  |  |  |  |  |
| Max. gauge (mils) | .60 |  |  |  |  |  | .60 |  |  | .600 |  |  | .70 |  |  |
| Min. gauge (mils) | .49 |  |  |  |  |  | .50 |  |  | .520 |  |  | .52 |  |  |
| Coeff. of friction | .55 |  | .46 |  |  | .50 | .51 |  | .62 |  |  | .48 |  |  | .43 |

TABLE III.—HEAT SEAL STRENGTHS OF TEST FILMS

|  | Example | | | Control | | |
|---|---|---|---|---|---|---|
|  | 3 | 4 | 5 | C | D | E |
| Sealing temperature, °F | 350 | 330 | 350 | 360 | 345 | 345 |
| Seal strength (gms./in.): |  |  |  |  |  |  |
| Average | 55 | 110 | 113 | 168 | 21 | 20 | 181 |
| Range | 131 | 147 | 165 | 27 | 40 | 50 | 59 |
| High | 144 | 175 | 210 | 185 | 48 | 59 | 229 |
| Low | 13 | 28 | 25 | 158 | 40 | 9 | 170 |

It will be noted from the preceding tabular summary (see Table II) that the physical properties of the film embodiments of the present invention (Examples 1-3) are similar to control films (Controls A and B) which do not incorporate the low molecular weight polyethylene wax additive hereof, yet possess improved aged impact strength and optical characteristics.

It will be further noted (see Table III) that the test films of the present invention (Examples 3-5) possessed superior heat-sealing characteristics as compared with uncoated biaxially oriented control films (Controls C and D). Moreover, a polypropylene film of the present invention having a Japan wax coating (Example 5) exhibited seal strengths substantially equal to those exhibited by a special film incorporating such a topcoat plus a pre-coat designed to facilitate both improved adhesion to the film and improved heat-sealing characteristics (Control E).

It will be noted that various changes may be made in the preferred methods and compositions exemplified above without departing from the scope of the present invention. Accordingly, the preceding description should be construed as illustrative and not in a limiting sense.

What is claimed is:

1. A biaxially oriented polypropylene film, comprising a mixture of a polypropylene resin and a low molecular weight polyethylene wax in an amount of from 2% to 10% by weight of the film composition.

2. The biaxially oriented polypropylene film of claim 1, in which said polyethylene wax has an average molecular weight of from 1500 to 3000.

3. The biaxially oriented polypropylene film of claim 1, further incorporating a slip additive in an amount of from 100 to 2000 p.p.m. by weight of the film composition.

4. The biaxially oriented polypropylene film of claim 1, in which said polyethylene wax has an average molecular weight of about 2000 and is admixed with said polypropylene resin in an amount of about 5% by weight of the film composition.

References Cited

UNITED STATES PATENTS

| | | | |
|---|---|---|---|
| 3,223,764 | 12/1965 | Kahn | 264—178 |
| 3,243,395 | 3/1966 | Guillet. | |
| 3,299,177 | 1/1967 | Reding | 260—878 |
| 3,322,708 | 5/1967 | Wilson. | |
| 3,246,061 | 4/1966 | Blatz. | |

MORRIS LIEBMAN, Primary Examiner

P. R. MICHL, Assistant Examiner

U.S. Cl. X.R.

260—897; 264—210, 211, 289